(12) United States Patent
Agar et al.

(10) Patent No.: US 11,233,683 B2
(45) Date of Patent: Jan. 25, 2022

(54) HART SAMPLING (71) Applicant: ROCKWELL AUTOMATION LIMITED, Milton Keynes (GB)

(72) Inventors: Philip J. Agar, Danbury (GB); Alison Cooper, Danbury Chelmsford (GB)

(73) Assignee: ROCKWELL AUTOMATION LIMITED, Milton Keynes (GB)

( * ) Notice: Subject to any disclaimer, the term of this patent is extended or adjusted under 35 U.S.C. 154(b) by 0 days.

(21) Appl. No.: 16/850,378

(22) Filed: Apr. 16, 2020

(65) Prior Publication Data
US 2020/0244494 A1 Jul. 30, 2020

Related U.S. Application Data (63) Continuation of application No. 14/504,637, filed on Oct. 2, 2014, now abandoned.

(30) Foreign Application Priority Data

Oct. 10, 2013 (EP) ..................... 13188181

(51) Int. Cl.
*H04L 27/14* (2006.01)
*H04L 27/156* (2006.01)
*H04L 27/10* (2006.01)
*H04L 27/144* (2006.01)

(52) U.S. Cl.
CPC ............ *H04L 27/14* (2013.01); *H04L 27/106* (2013.01); *H04L 27/1563* (2013.01); *H04L 27/144* (2013.01)

(58) Field of Classification Search
CPC ... H04L 27/14; H04L 27/106; H04L 27/1563; H04L 27/144
See application file for complete search history.

(56) References Cited

U.S. PATENT DOCUMENTS

| 5,017,920 A | 5/1991 | French |
| 5,818,296 A | 10/1998 | Ho |
| 6,650,712 B1 | 11/2003 | Leonidov et al. |
| 6,785,347 B1 | 8/2004 | Liu |
| 10,200,163 B1 * | 2/2019 | Yoshioka ............ H04L 27/1563 |

(Continued)

OTHER PUBLICATIONS

Extended European Search Report dated Mar. 19, 2014, Application No. 13188181.5—(3) pages.

*Primary Examiner* — Aristocratis Fotakis (57) ABSTRACT

A method for processing an electrical signal comprises receiving an electrical signal comprising a frequency modulated signal encoding digital data; sampling a first portion of the electrical signal to obtain a plurality of samples to obtain a first sample set; determining an index value from the first sample set by assigning a value to each sample in the first sample set based upon an amplitude of the sample; comparing the determined index value with a plurality of predetermined index values to identify a first output value from a plurality of predetermined output values, each of the predetermined index values corresponding to one of the plurality of predetermined output values; and outputting an indication of the output value. Each of the predetermined output values indicates a respective frequency modulation encoded value and the first output value indicates a frequency modulation encoded value within the first portion of the electrical signal.

20 Claims, 11 Drawing Sheets (56) References Cited

U.S. PATENT DOCUMENTS

| | | | |
|---|---|---|---|
| 2005/0012544 A1 | 1/2005 | Shiung | |
| 2007/0153947 A1 | 7/2007 | Ha | |
| 2008/0253480 A1* | 10/2008 | Furman | H03C 3/00 |
| | | | 375/303 |
| 2009/0168857 A1 | 7/2009 | Golborne | |
| 2011/0286542 A1 | 11/2011 | Shelburne | |
| 2013/0051436 A1* | 2/2013 | O'Keeffe | H04L 25/08 |
| | | | 375/219 |
| 2013/0243107 A1 | 9/2013 | Chmelar | |
| 2015/0030089 A1* | 1/2015 | Alley | H04L 12/40032 |
| | | | 375/258 |
| 2017/0078121 A1* | 3/2017 | Wang | H04L 25/062 |

\* cited by examiner

HART SAMPLING

CROSS-REFERENCE TO RELATED APPLICATIONS

This application claims priority to U.S. patent application Ser. No. 14/504,637, filed Oct. 2, 2014, which claims priority to European patent application number 13188181.5, filed Oct. 10, 2013 and granted as EP2860928. The entire contents of both are incorporated herein by reference.

BACKGROUND

The subject matter disclosed herein relates generally to methods and apparatus for processing electrical signals, and in particular analogue electrical signals having digital signals encoded therein and, more specifically, to processing analogue electrical signals having HART signals encoded therein.

Analogue current loops, on which only one current level can be present at any one time, are commonly used to remotely monitor and/or control field devices. A 4-20 mA (four to twenty milliamps) current loop is a well-known and widely adopted analogue electrical transmission standard for industrial instrumentation and communication. The 4-20 mA signal is provided via a current loop where 4 mA represents zero signal and 20 mA represents maximum signal. Use of a 4 mA signal to represent zero signal, rather than 0 mA, allows an open circuit condition to be detected.

The Highway Addressable Remote Transducer (HART) Communications Protocol was developed to provide a digital industrial automation protocol capable of being used over 4-20 mA analogue current loops, sharing the pair of wires used by a 4-20 mA system.

The HART protocol makes use of Bell 202 compatible Frequency Shift Keying (FSK) signals to superimpose digital communication signals at a low level on 4-20 mA analogue signals. Bell 202 compatible systems use 1200 Hz to represent a mark ('1') and 2200 Hz to represent a space ('0'). HART enables two-way field communication to take place and makes it possible for additional information, beyond the process variables communicated by the 4-20 mA signal, to be sent to and from a HART enabled field instrument.

While newer industrial process protocols, such as Fieldbus, exist for providing real-time distributed control of field devices, the installed base of 4-20 mA analogue current loops is large, and as such HART remains in widespread usage. It is, therefore, desirable to provide improved methods and systems for HART signal processing.

BRIEF DESCRIPTION

The subject matter disclosed herein describes an improved method and system for processing analogue signals having digital communication signals encoded using the HART protocol.

One embodiment of the disclosure is a method for processing an electrical signal. The method includes receiving an electrical signal comprising a frequency modulated signal encoding digital data; sampling a first portion of the electrical signal to obtain a plurality of samples to obtain a first sample set; determining an index value from the first sample set by assigning a value to each sample in the first sample set based upon an amplitude of the sample; comparing the determined index value with a plurality of predetermined index values to identify a first output value from a plurality of predetermined output values, each of the predetermined index values corresponding to one of the plurality of predetermined output values; and outputting an indication of the output value. Each of the predetermined output values indicates a respective frequency modulation encoded value and the first output value indicates a frequency modulation encoded value within the first portion of the electrical signal.

Another embodiment of the disclosure is an apparatus for processing an electrical signal. The apparatus includes a receiver, a sampler, a memory, and a processing module. The receiver is arranged to receive an electrical signal comprising a frequency modulated signal encoding digital data. The sampler is arranged to sample a first portion of the electrical signal to obtain a plurality of samples to obtain a first sample set, and to determine an index value from the first sample set by assigning a value to each sample in the sample set based on an amplitude of the sample. The memory stores a plurality of predetermined index values and a plurality of predetermined output values. Each of the predetermined index values corresponds to one of the plurality of predetermined output values. Each of the predetermined output values indicates a respective frequency modulation encoded value. The processing module is arranged to process the first sample set to compare the determined index value with the predetermined index values to identify a first output value from the plurality of predetermined output values and output an indication of the obtained output value. The first output value indicates a frequency modulation encoded value within the first portion of the electrical signal.

Generally it will be appreciated that embodiments of the disclosure can be implemented in any convenient form. For example, aspects of the disclosure can be implemented by suitable computer programs. Aspects of the disclosure may provide transitory and/or non-transitory carrier media and computer readable media carrying such computer programs. Further aspects of the disclosure may provide apparatus arranged to carry out the methods described herein. Such apparatus may take the form of a general purpose computer system comprising a memory storing processor readable instructions and a processor arranged to read and execute those instructions, the instructions comprising instructions controlling the processor to carry out methods described herein.

It will also be appreciated that features presented in the context of one aspect or embodiment of the disclosure in the preceding and following description can equally be applied or combined with other aspects or embodiments of the disclosure.

These and other advantages and features of the disclosure will become apparent to those skilled in the art from the detailed description and the accompanying drawings. It should be understood, however, that the detailed description and accompanying drawings, while indicating preferred embodiments of the present disclosure, are given by way of illustration and not of limitation. Many changes and modifications may be made within the scope of the present disclosure without departing from the spirit thereof, and the disclosure includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

In describing the various embodiments disclosure which are illustrated in the drawings, specific terminology will be resorted to for the sake of clarity. However, it is not intended that the disclosure be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION 4-20 mA analogue electrical signals are used to connect industrial devices comprising sensors and transmitters to controlling equipment within industrial process control systems. The 4-20 mA signal communicates conditions sensed by the sensor such as pressure, temperature differential pressure, etc. Benefits of the 4-20 mA standard include the ability to detect open circuit conditions by a signal dropping to 0 mA, and that use of a current signal is robust over long distances given that current signals are generally resilient to noise interference and voltage drop. The 4-20 mA signal is generally referred to as the primary value (PV).

Many industrial devices that utilize the 4-20 mA standard also comprise a microcontroller to control their operation. As many industrial devices are installed in hostile or inaccessible environments, the Highway Addressable Remote Transducer (HART) protocol is used to remotely communicate and configure a microcontroller. HART superimposes a Frequency Shift Keying (FSK) signal on the 4-20 mA signal, arranged so that the FSK signal can be filtered out of the received signal, allowing both the FSK signal and the original analogue 4-20 mA signal to be read.

An additional benefit of the HART protocol is that additional data can be gathered from an industrial device during operation. For example, serial numbers, fault data, calibration data, and more accurate digital values can be read. Additionally, HART provides for the reading of more than one value. For example, a pressure sensor may provide a pressure signal over a 4-20 mA PV and, through HART, may additionally provide a process temperature.

The generation, and superimposition onto 4-20 mA signals, of HART FSK signals is well known in the art and as such is not described herein. It will be appreciated, however, that suitable 4-20 mA signals comprising HART FSK signals may be generated using any suitable method. For example, HART signals may be generated as described in co-pending European Publication No. EP2413300. In general terms, however, each HART message (or packet) is formed from a plurality of data bytes (8-bits), including data bytes indicating a start of a message (i.e. a preamble), data bytes containing the data to be transmitted, and a data byte, in the form of a checksum, indicating an end of a message. At a HART transmitter, each HART data byte is transmitted in an 11-bit character, each 11-bit character comprising a start bit, the data byte, a parity bit and a stop bit. A logic '1' (or mark) is represented by a 1200 Hz periodic signal, while a logic '0' (or space) is represented by a 2200 Hz periodic signal by modulating the 4-20 mA signal through continuous phase FSK modulation.

At a receiver, the FSK signal is converted back into a serial bit stream. Each 11-bit character is identified from the serial bit stream (the pre-amble being identified first), the data byte of that character obtained, and the HART message determined from the contents of the received data bytes. Methods for decoding received 4-20 mA signals to convert received FSK signals into a serial bit stream without the use of a dedicated HART modem are now described.

Figure 1:
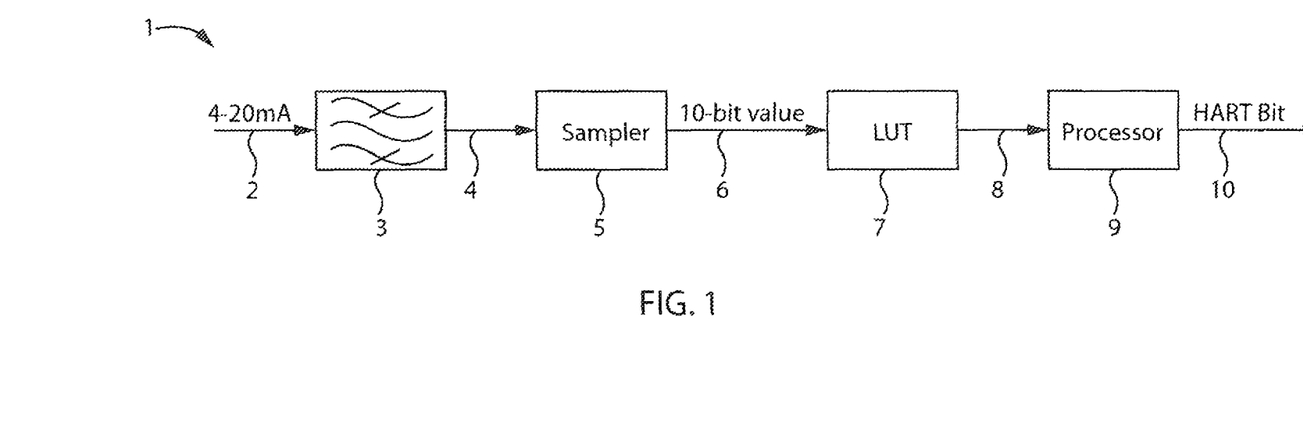
FIG. 1 is a schematic illustration of a decoding apparatus according to some embodiments described herein.
Figure 2:
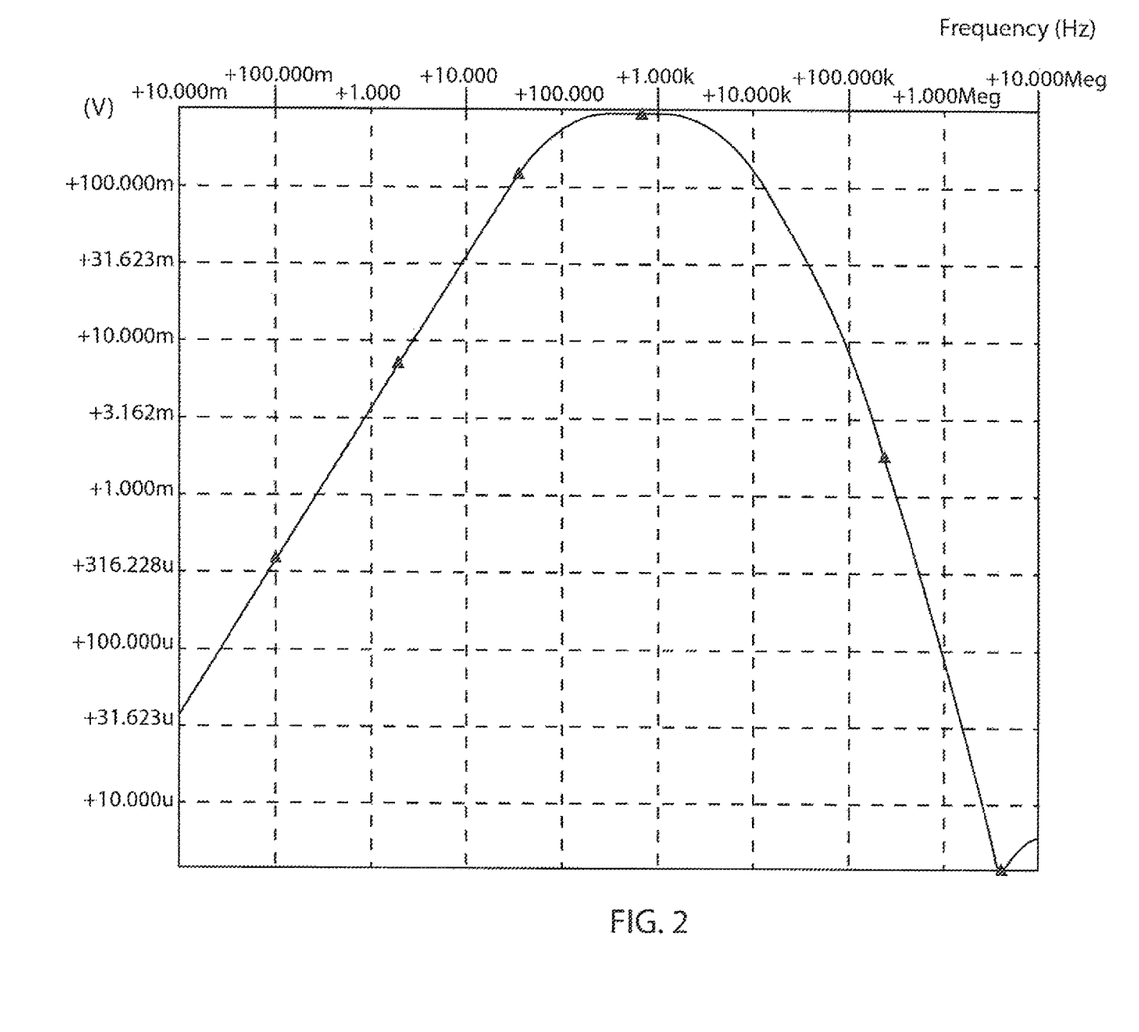
FIG. 2 is a representation of a filter response of a filter of the apparatus of FIG. 1.

In FIG. 1 a decoding apparatus 1 for processing a received analogue signal to obtain HART data is shown. An input signal 2 is received from a HART transmitter (not shown), the input signal 2 comprising a 4-20 mA analogue signal on which has been superimposed an FSK signal. The signal 2 is passed to a band-pass filter 3 for filtering. The band-pass filter 3 has a passband of approximately 1 KHz to 3 KHz and outputs a filtered analogue signal 4. The band-pass filter 3 acts to separate the HART FSK signal from the input signal 2 and to remove noise and avoid aliasing when the output signal 4 is sampled as described below. In the presently described embodiment, the band pass-filter 3 has a frequency response as shown in FIG. 2 and a pass-band voltage gain of approximately 3 dB. It is to be understood, however, that any suitable filter may be used.

From the band-pass filter 3, the signal 4 is passed to a sampler 5. According to one embodiment of the disclosure, the sampler 5 is arranged to sample the signal 4 at a sampling rate of 83.3 µs and at a sampling depth of 1-bit. For each sample obtained by the sampler 5, a value of '1' is assigned if the sampled voltage is above a threshold voltage, and a value of '0' is assigned if the sampled voltage is at or below the threshold voltage. In some embodiments, the threshold against which a sample is judged is the quiescent point of the signal 4 output from the band-pass filter 3.

The output of the sampler 5 is used by the decoding apparatus 1 to provide a 10-bit sliding window over the signal 4. The 10-bit sliding window slides by 1-bit to provide a new 10-bit sample set 6 every 83.3 µs. It will be appreciated that the sliding window covers a portion of the signal 4 of the same length as that used by the HART protocol to encode a single HART data bit (i.e. 833 µs). A sliding window of 10-bits and a sampling period of 83.3 µs has been found to provide sufficient decoding performance in the presence of interference to be consistent with the requirements of the HART physical layer protocol. While increased decoding performance can be achieved with a higher sampling rate, or a greater bit depth, this would result in increased, and therefore more expensive, processing and storage requirements. As such, a sampling rate of 83.3 µs at a bit depth of 1-bit provides a particularly beneficial arrangement.

It is to be appreciated, however, that in other embodiments, the sampler 5 may be arranged to sample at a greater bit depth and at a greater sampling frequency. For example, the sampler 5 may be configured to sample the signal 4 every 8.33 µs to provide a 100-bit sliding window covering a portion of the signal 4 having equal length to a portion of the signal 4 used to encode a HART data bit. Indeed, it will be apparent from the teaching herein that the sampler 5 may sample at any suitable bit depth and with any suitable frequency. It will be appreciated that the sampler 5 may be implemented in any appropriate way.

Each 10-bit sample set 6 is used as an index into a lookup table (LUT) 7. The LUT 7 comprises one-thousand-twenty-four entries, one entry for each of the possible patterns of bits in the 10-bit sample set 6. Within the LUT 7, each possible 10-bit sample set 6 is associated with a value indicating a HART data bit. Upon receipt of each 10-bit sample set 6 from the sampler 5 (i.e. every 83.3 µs), the LUT 7 is used to provide an output 8 indicating whether the portion of the signal 4 corresponding to the 10-bit sample set 6 is most likely to encode a mark ('1') (or transition from a space to a mark) or most likely encodes a space ('0') (or transition from a mark to a space). For example, the output 8 of the LUT 7 may be implemented as a single bit, but may equally be implemented in any other way.

In every 833 µs period, the LUT 7 outputs ten indications, while in general only a single HART data bit 10 is output in the same period by the decoding apparatus 1. In some embodiments, a HART data bit for a particular 833 µs period is the value of a predetermined one of the ten indications output by the LUT 7 in that period. A transition reference count (not shown in FIG. 1) is maintained by the decoding apparatus 1, the transition reference count being synchronized with the HART data bit period of the signal 4. That is, the transition reference count is in Phase Locked Loop with the HART signal encoded in the signal 4.

In more detail, the decoding apparatus 1 is configured to increment the transition reference count by a value of one, in a loop between values of zero and nine, in response to each output of the LUT 7. Table 1 below illustrates the state of the transition reference count following respective outputs from the LUT 7, where each output from the LUT 7 indicates that the portion of the signal 4 being processed most likely encodes a space ('0') (or a transition from a mark to a space).

TABLE 1

| LUT output value | Transition Reference Count |
| --- | --- |
| 0 | 0 |
| 0 | 1 |
| 0 | 2 |
| 0 | 3 |
| 0 | 4 |
| 0 | 5 |
| 0 | 6 |
| 0 | 7 |
| 0 | 8 |
| 0 | 9 |
| 0 | 0 |

When synchronized with the HART data bit period of the signal 4, a transition reference count value of zero indicates that the most recent sample in a 10-bit sample set 6 is likely to be a first sample of a new HART data bit. A transition reference count value of nine indicates that the most recent sample in the 10-bit sample set 6 is likely to be the last sample of a HART data bit. A transition reference count value between zero and nine indicates that the most recent sample in the 10-bit sample set 6 is likely to have been taken from the middle portion of a HART data bit encoded in the signal 4.

In some embodiments, to synchronize the transition reference count with the HART data bit period, the transition reference count is reset upon detection of a transition between a space and a mark within the signal 4, as illustrated in Table 2.

In Table 2, a first four outputs of the LUT 7 indicate a space. In response to each of the first four outputs from the LUT 7, therefore, the transition reference count is incremented by one. A fifth output of the LUT 7 indicates a mark. That is, the fifth output of the LUT 7 indicates a possible transition between a space and a mark in the signal 4. Upon detecting the possible transition, the transition reference count is reset to zero. While each output of the LUT 7 continues to indicate a mark, the transition reference count is incremented by one for each output from the LUT 7.

TABLE 2

| LUT output value | Transition Reference Count |
| --- | --- |
| 0 | 0 |
| 0 | 1 |
| 0 | 2 |
| 0 | 3 |
| 1 | 0 |
| 1 | 1 |
| 1 | 2 |
| 1 | 3 |
| 1 | 4 |
| 1 | 5 |
| 1 | 6 |
| 1 | 7 |
| 1 | 8 |
| 1 | 9 |

In this way, as described above, a transition reference count value of zero indicates the start of a HART data bit, while a transition reference count value of nine indicates the end of a HART data bit.

Detection of transitions between HART data bits may not always be entirely accurate. In some embodiments, therefore, each HART data bit value 10 output by the decoding apparatus 1 is selected from one or more of the LUT output values 8 between a transition reference count value of zero and a transition reference count value of nine. For example, it may be desirable to select a HART data bit 10 from a LUT output value 8 generated by a central portion of a HART data bit period (e.g. a LUT output value 8 having a transition reference count value of four, or five). In some embodiments, therefore, the processor 9 is configured to output a HART data bit 10 corresponding to the output 8 of the LUT 7 having a corresponding transition reference count of a particular predetermined value. In one particular embodiment, the processor 9 is configured to output a HART data bit 10 having the value of the LUT output 8 with a corresponding transition reference count of 4.

By outputting a HART data bit 10 with a value selected from a value output by the LUT 7 in response to processing a middle portion of a HART data bit of the signal 4, the decoding apparatus 1 is more robust to false transitions. That is, while it is possible to output a HART data bit 10 immediately upon detecting a transition, noise in the signal 4 may result in false detections of HART data bit transitions.

In some embodiments, the processor 9 is configured to output an average (e.g. a mode) of a predetermined number of received outputs 8. For example, the output 8 of the LUT 7 having transition reference values of three, four and five may be subject to a two-out-of-three vote, with the result of the vote being provided as the HART data bit 10.

In some embodiments, to further mitigate the effects of noise, the transition reference count is not reset to zero immediately upon detection of a possible transition in the signal 4. For example, in some embodiments, upon detection of a possible transition, the transition reference count is adjusted so as to be closer to zero, without actually being reset to zero. For example, the transition reference count may be incremented or decremented by one in dependence upon on whether an increment or a decrement would result in the transition reference count being closer to zero. In this way, noise resulting in a false indication of a transition in the signal 4 does not cause large fluctuations in the transition reference count (and corresponding loss of synchronization). Table 3 illustrates an example in which the transition reference count is adjusted towards zero, rather than directly reset upon detection of a possible transition.

TABLE 3

| LUT output value | Transition Reference Count |
|---|---|
| 0 | 0 |
| 0 | 1 |
| 0 | 2 |
| 0 | 3 |
| 1 | 3 |
| 0 | 4 |
| 0 | 5 |
| 0 | 6 |
| 0 | 7 |
| 0 | 8 |
| 1 | 0 |
| 1 | 1 |
| 1 | 2 |
| 1 | 3 |

In Table 3, the first four outputs from the LUT 7 each indicate that the portion of the signal 4 being processed likely encodes a space. A fifth output of the LUT 7 indicates a possible transition between a space and a mark. At the fifth output, in the absence of a possible transition, the transition reference count would be incremented to four. In light of the possible transition, however, the transition reference count is adjusted in the direction closest to zero. In this case, therefore, the transition reference count is decremented from a value of four, to a value of three.

A sixth output of the LUT 7 indicates that the portion of the signal 4 being processed likely encodes a space. This indicates that the fifth output of the LUT 7 did not indicate a genuine transition. It will be appreciated that because the transition reference count was only adjusted by a single decrement, any detrimental effect on the synchronization between the transition reference count and the HART data bit period of the signal 4 is reduced.

An eleventh output of the LUT 7 again indicates that the portion of the signal 4 being processed indicates a possible transition between a space and a mark. In this case, the transition reference count is incremented by one (as in this case incrementing moves the transition reference count closer to a value of zero). As such, while the transition reference count would have had a value of nine, the transition reference count takes a value of zero. The twelfth, thirteenth and fourteenth outputs of the LUT 7 continue to indicate a transition towards a mark, indicating that the transition indicated by the eleventh output was a genuine transition. As such, the adjustment to the transition reference count in the direction of zero at the eleventh output of the LUT 7 is such that the transition reference count is again synchronized to the HART data bit period of the signal 4.

Figure 3:
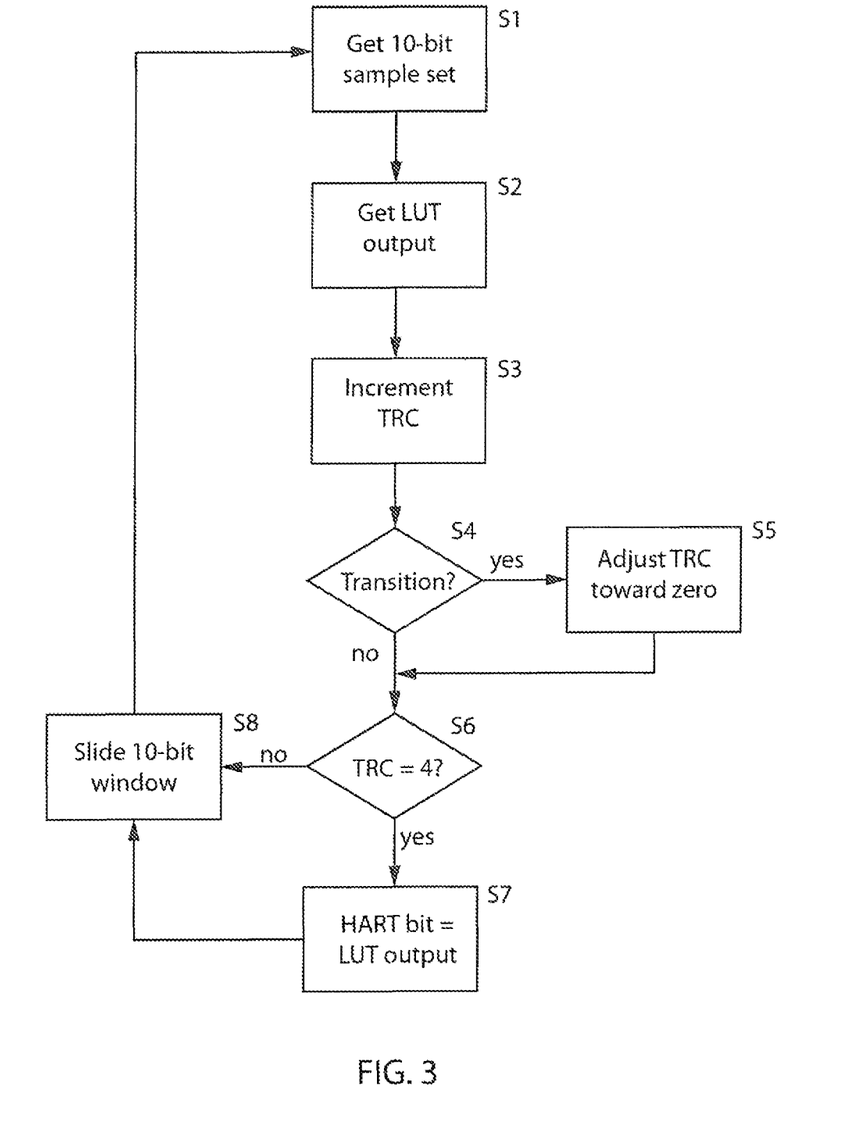
FIG. 3 is a flowchart showing processing carried out by the decoding apparatus of FIG. 1 to determine an output value.

FIG. 3 is a flowchart illustrating processing that may be performed by the decoding apparatus 1 to select a HART output value 10 based on the outputs from the LUT 7 and the transition reference count. At a step S1, a 10-bit sample set 6 is obtained from the outputs of the sampler 5. The 10-bit sample set 6 is used as an index to the LUT 7 at step S2 to obtain a LUT output indicating whether the 10-bit sample set 6 indicates a mark or a space. Processing passes to step S3 at which the transition reference count is incremented. Processing passes to step S4 at which it is determined whether the LUT output generated at step S2 indicates a transition between data bits. If it is determined at step S4 that the LUT output of step S2 does indicate a transition, processing passes to step S5. At step S5 the transition reference count is adjusted towards zero. For example, if the transition reference count has a value of '1', '2', '3' or '4', the transition reference count is decremented, while if the transition reference count has a value of '5', '6', '7', '8', or '9', the transition reference count is incremented. It will be appreciated that if the transition reference count has a value of '5', it may be incremented or decremented. If the transition reference count has a value of '0', it is not adjusted. Processing passes from step S5 to step S6.

If, on the other hand, it is determined at step S4 that the LUT output of step S2 does not indicate a transition, processing passes from step S4 to step S6. At step S6 it is determined whether the transition reference count has a predetermined value. In the example of FIG. 3, the predetermined value is '4', though it will be appreciated that the predetermined value may be any predetermined value between '0' and '9' in the example of FIG. 3, and any value more generally depending upon the implementation of the transition reference count. If it is determined at step S6 that the transition reference count is at the predetermined value, processing passes to step S7 at which the LUT output of step S2 is provided as a HART data bit. That is, if the LUT output of step S2 indicates a mark, the HART data bit output at step S7 is a mark, while if the LUT output of step S2 indicates a space, the HART data bit output at step S7 is a space.

Processing passes from step S7 to step S8 at which the sliding window is moved by one sample before processing passes back to step S1. If, on the other hand, it is determined at step S6 that the transition reference count is not at the predetermined value, processing passes directly from step S6 to step S8.

It will be appreciated that in other embodiments, adjustments to the transition reference count may be made other than those described above. For example, upon detection of a possible transition the transition reference count may be incremented or decremented in the direction of zero by a value greater than one.

A method for populating the LUT 7 is now described with reference to FIG. 4. Generally, the LUT 7 is populated by determining, for each possible 10-bit sample set 6, whether the HART signal that results in that 10-bit sample set 6 (i.e. the HART signal which causes the sampler 5 to output that 10-bit digital sample set) represents a mark or a space.

Figure 4:
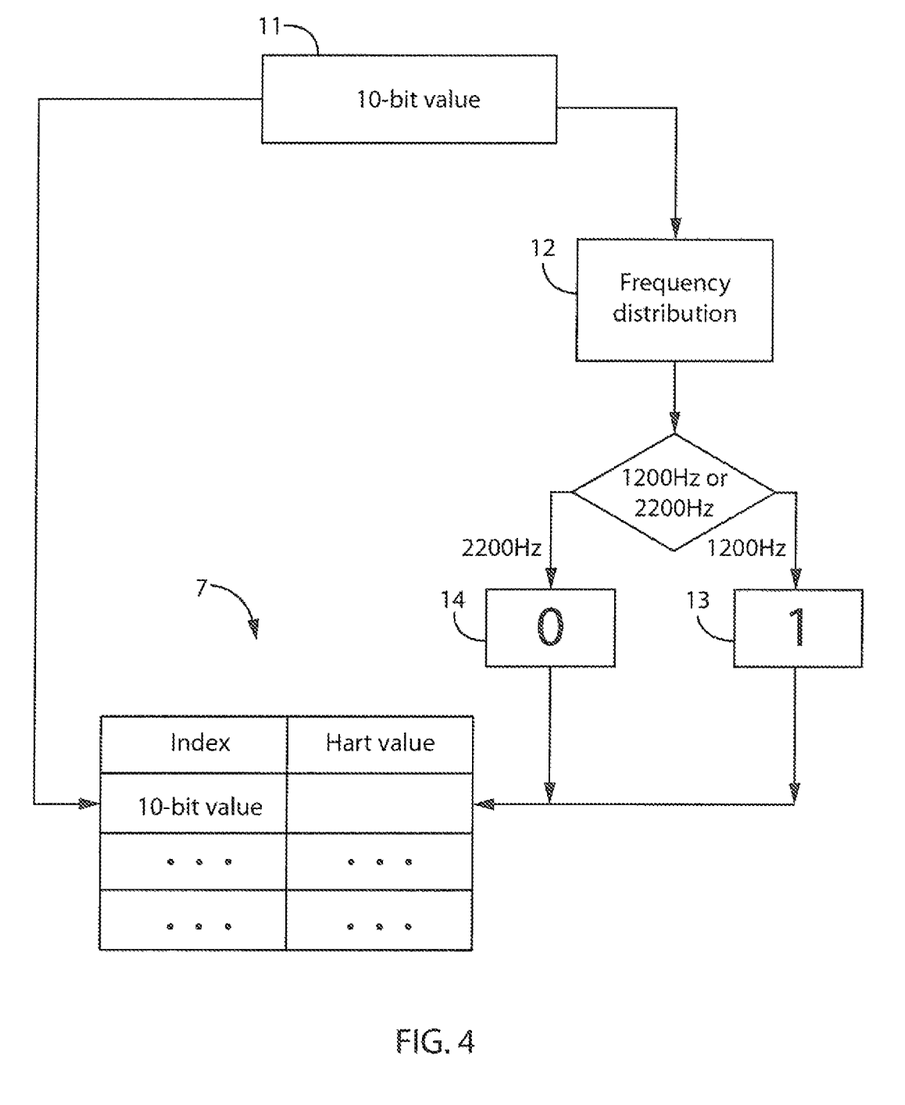
FIG. 4 is a schematic representation of a method for populating a LUT used in the apparatus of FIG. 1.

The population of a single row of the LUT 7 is schematically illustrated in FIG. 4. From a 10-bit digital value 11, a frequency distribution 12 is calculated. The frequency distribution 12 may be calculated by applying a Fourier transform (e.g. using a Fast Fourier Transform (FFT) algorithm) to the 10-bit value 11, for example. In other embodiments, the frequency distribution 12 may be calculated by applying a Fourier transform to an electrical signal that samples to the 10-bit value 11.

From the frequency distribution 12 a HART data bit 13 is determined in accordance with the HART protocol. In particular, if the frequency distribution 12 is centered on or around 1200 Hz, a mark ('1') data bit 13 is recorded in the LUT 7, while if the frequency distribution 12 is centered on or around 2200 Hz, a space '0' data bit 14 is recorded. Together, the 10-bit digital value 11 and the selected HART data bit 13, 14 constitute a single row of the LUT 7.

The LUT 7 need only be populated once, and may be populated "offline" (i.e. before the decoding apparatus 1 is used to decode signals in a live system). In this way, minimal "online" processing is required to determine a HART value from a received signal 2. As such, operations such as Fourier transforms need not be performed online.

It is described above that the LUT 7 contains 1024 values. It will be appreciated that where the sampler 5 samples at a greater bit-depth or a greater bit-rate, the number of entries in the LUT 7 will be greater.

The serial output 10 of the processor 9 may be passed to a further processor (not shown) arranged to process the output to determine a complete HART message from the outputs 10. While the decoding apparatus 1 is schematically illustrated and described above as comprising a separate filter, sampler, LUT and processor, it will be appreciated that the decoding apparatus 1 may be implemented in any way. For example, the decoding apparatus 1 may be implemented with one or more dedicated hardware devices and/or in software/firmware.

Embodiments for decoding analogue current signals which may be used in industrial process control systems were described above. An example of an industrial process control system in which embodiments described above may be used is schematically illustrated in FIG. 5, in which a distributed architecture is designed to be used in different SIL (Safety Integrity Level) environments, so that if a high SIL is required it can be provided, but if a low SIL is all that is needed the system can be reduced in complexity in order to reduce unnecessary extra costs.

Figure 5:
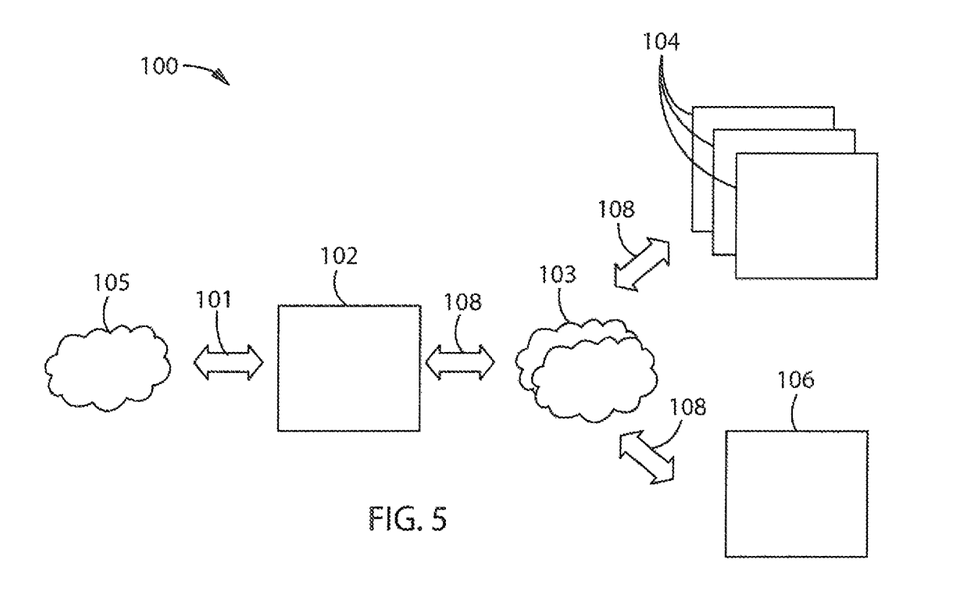
FIG. 5 is a schematic illustration of an architecture of a distributed industrial process control system in which embodiments described herein may be utilized.

In FIG. 5, an exemplary industrial process control system 100 comprises a workstation 102, one or more controllers 104, and a gateway 106. The workstation 102 communicates with the controllers 104 and the gateway 106 via Ethernet connections 108 to one or more control networks 103. Multiple Ethernet connections 108 provide redundancy to improve fault tolerance. The workstation 102 may be connected via a conventional Ethernet connection 101 to another external network 105.

Figure 6:
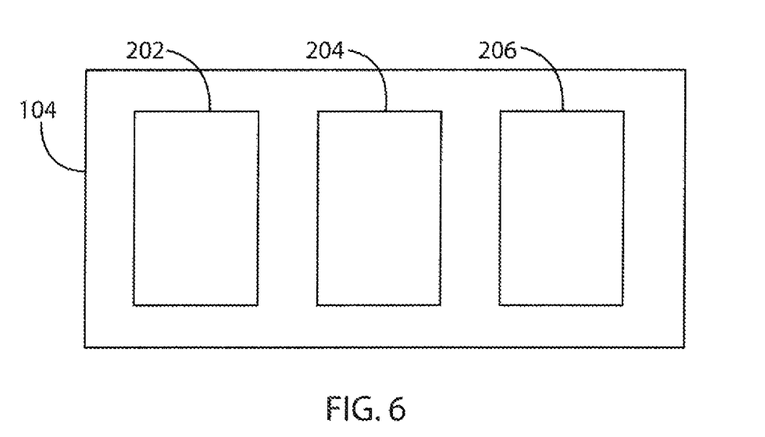
FIG. 6 is a schematic illustration of a controller of the industrial process control system of FIG. 5.

An example implementation of a controller 104 is described in more detail with reference to FIGS. 6 and 7. Referring to FIG. 6, the depicted controller 104 comprises an input assembly 202, a processor assembly 204, and an output assembly 206. In the schematic illustration of FIG. 6, the input assembly 204 and output assembly 206 are on different backplanes but it will be appreciated that in other embodiments, the input assembly 204 and the output assembly 206 may equally well share a single backplane.

Assemblies 202, 204, 206 are created from one or more communications backplane portions. Each backplane portion comprises three slots, each slot able to accommodate respective modules, together with termination assemblies. Each termination assembly comprises up to three slots, which interface to field sensors and transducers. A termination assembly may straddle two contiguous backplane portions. A module comprises a plug-in card with multiple connectors for plugging onto a communications backplane and a termination assembly.

It will be appreciated that while the exemplary arrangement shown in FIG. 6 comprises three slots per backplane portion, other arrangements with greater (or fewer) slots per backplane portion may be provided in other embodiments.

Figure 7:
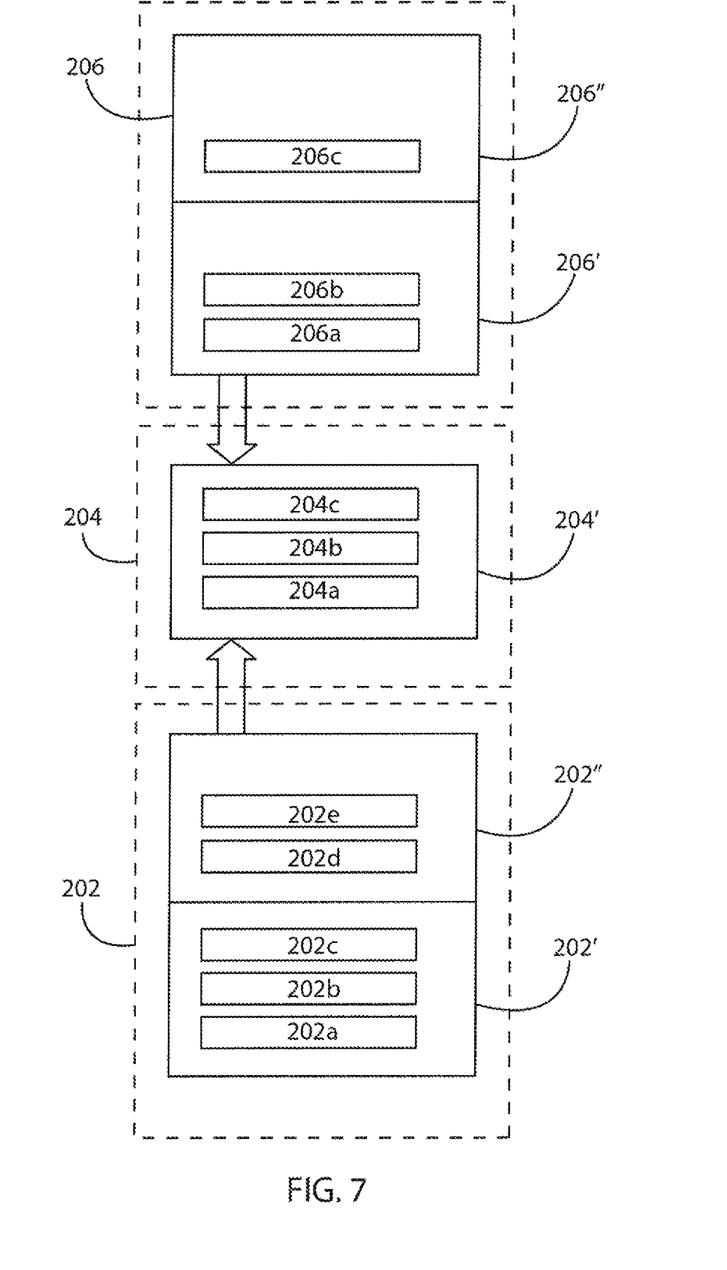
FIG. 7 is a schematic illustration of a possible configuration of a controller.

FIG. 7 illustrates an example physical configuration of the controller 104. In the example shown in FIG. 7, the input assembly 202, output assembly 206 and processor assembly 204 are physically separated from one another by grouping the modules of different types onto separate communications backplanes. That is, input modules are grouped onto one communications backplane, processor modules are grouped onto another communications backplane, while output modules are grouped onto yet another communications backplane.

In the example shown in FIG. 7, the input assembly 202 comprises two communications backplane and termination assembly portions, 202', 202". The first backplane and termination assembly portion 202' has a triplex input termination to which are connected three input modules 202a, 202b, 202c; the second backplane and termination assembly portion 202" has a duplex input termination assembly to which are connected two input modules 202d, 202e. The processor assembly 204 comprises a single processor backplane portion 204' having three processor modules 204a, 204b and 204c. The output assembly 206 comprises two backplane portions 206', 206". The first backplane portion 206' has a duplex output termination assembly with two output modules 206a, 206b and the second backplane portion 206" has a simplex output termination assembly with a single output module 206c.

Figure 8:
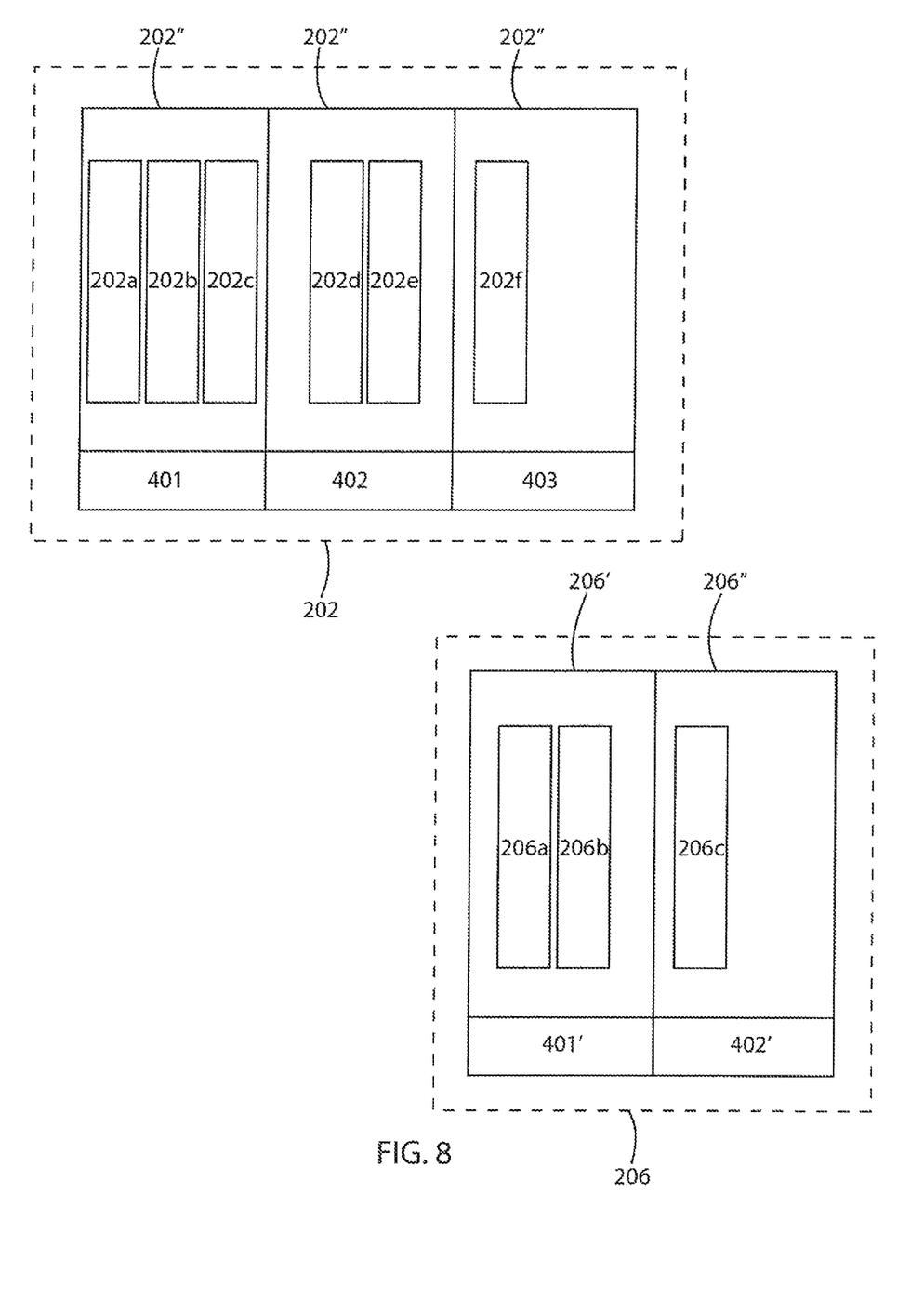
FIG. 8 is a schematic illustration of possible configurations of an input assembly and an output assembly of FIG. 5.

An alternative embodiment of the input assembly 202 is shown in FIG. 8. In FIG. 8, the input assembly 202 comprises three backplane portions/termination assemblies 202' 202" 202'". For example, a triplex backplane portion 202' having three modules 202a, 202b, 202c might be used for an application having a requirement of high availability, a duplex backplane portion 202" having two modules 202d, 202e might be provided for fault tolerant applications and a simplex portion 202'" with a single modules 202f might be provided for failsafe applications. The termination assemblies may be provided with different types of field conditioning circuits. For example, assembly 202' may be provided with a 24V DC field conditioning circuit 401 assembly 202" may be provided with a 120V DC field conditioning circuit 402 and assembly 202'" may be provided with a 4-20 mA field conditioning circuit 403. Similarly, possible configurations are shown for an output assembly 206. It will be appreciated that numerous configurations of backplane portions and termination assemblies with various different numbers of modules and various different types of field conditioning circuits are possible and are in no way limited to those shown in these examples.

Where an assembly provides more than one module for redundancy purposes it is possible to replace a failed module with a replacement module whilst the industrial process control system is operational which is also referred to herein as online replacement (i.e. replacement is possible without having to perform a system shutdown). Online replacement is not possible for a simplex assembly without interruption to the process. In this case various "hold last state" strategies may be acceptable or a sensor signal may also be routed to a different module somewhere else in the system.

The processor assembly configures a replacement processor module using data from a parallel module before the replacement module becomes active.

The field conditioning circuits 401, 402, 403 transform a signal received from a sensor monitoring industrial process control equipment to a desired voltage range, and distribute the signal to the input modules as required. Each field conditioning circuit 401, 402, 403 is also connected to field power and field return (or ground) which may be independently isolated on a channel by channel basis from all other grounds, depending on the configuration of the input termination assembly. Independent channel isolation is the preferred configuration because it is the most flexible. The field conditioning circuits 401, 402, 403 comprise simple non active parts and are not online replaceable.

Figure 9:
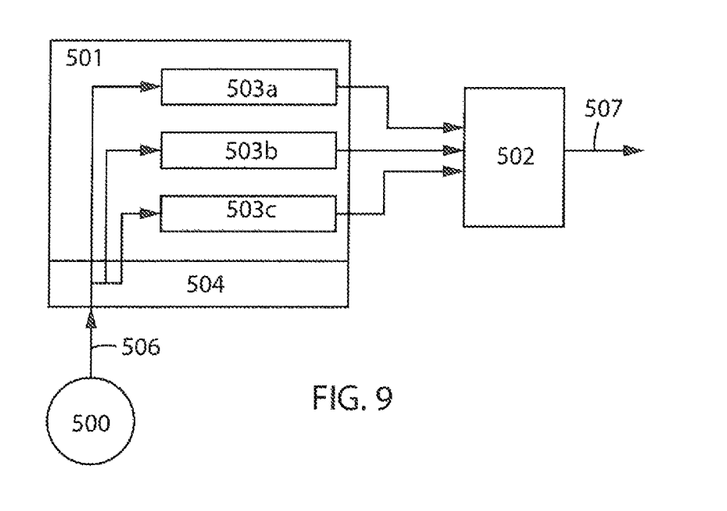
FIG. 9 is one exemplary illustration of a possible configuration of a two-out-of-three voting arrangement.
Figure 10:
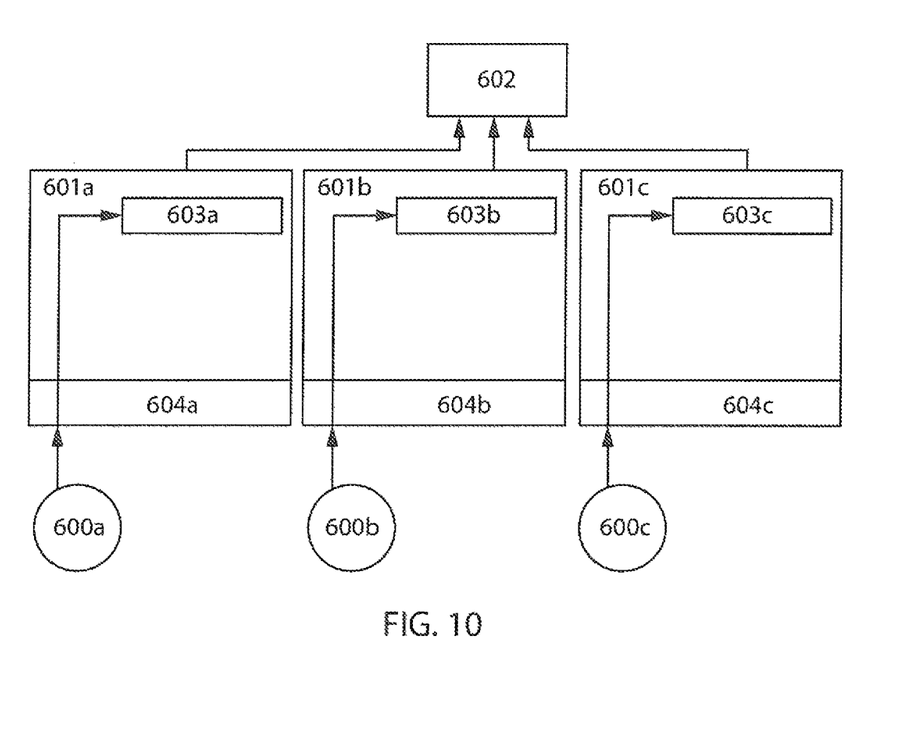
FIG. 10 is another exemplary illustration of a possible configuration of a two-out-of-three voting arrangement.

FIGS. 9 and 10 illustrate the flexibility of the industrial process control architecture described herein, each showing an alternative configuration of a triplex system for generating a signal with a high availability requirement. Referring to FIG. 9, an input assembly 501 comprises three replicated input modules 503a, 503b, 503c. The input assembly 501 receives a signal 506 from a sensor 500 via a field conditioning circuit in termination assembly 504. The signal may be, for example, a 4-20 mA signal including a HART FSK signal. The field conditioning circuit in the termination assembly 504 transforms the signal to a desired voltage range and distributes the signal to the three replicated input modules 503a, 503b, 503c. Each input module 503a-c processes the signal and the results of that processing are sent to a two-out-of-three voter 502 which generates a result signal 507 in dependence upon the output of each processing module 503a-c.

Referring to FIG. 10, three replicated sensors 600a-c, each send a respective signal to respective simplex assemblies 601a-c via respective field conditioning circuits in termination assemblies 604a-c. Each input module 603a, 603b, 603c processes the signal and provides its output to a two-out-of-three voter 602 to generate a signal in dependence thereon. It will be appreciated that many variations and configurations are possible in addition to those illustrated here.

Figure 11:
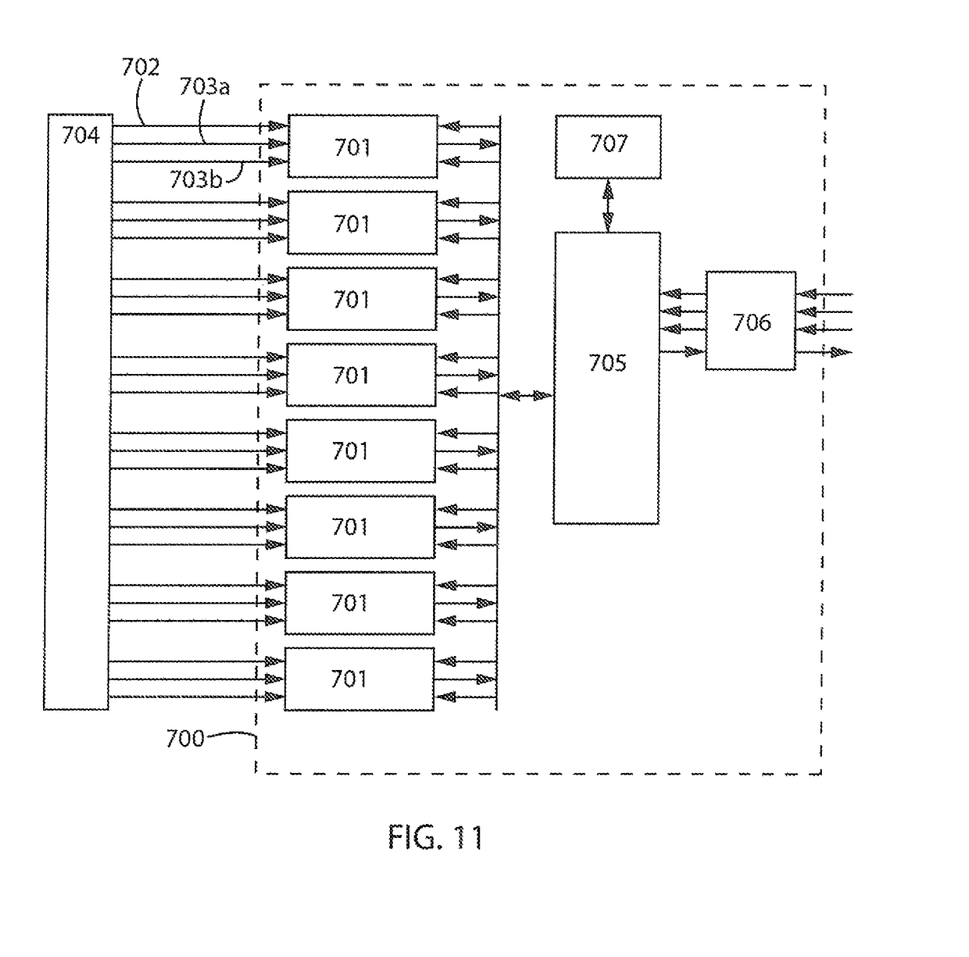
FIG. 11 is a schematic illustration of an input module.

FIG. 11 illustrates schematically an input module 700 in accordance with the present disclosure:

An input module 700 comprises eight isolated input channels 701. Each input channel 701 receives signals 702, 703a, 703b from field conditioning circuits in a termination assembly 704. Each input channel 701 communicates with a field programmable gate array (FPGA) 705 which interfaces to a backplane (not shown) via a non-isolated backplane interface 706. Light emitting diodes (LEDs) 707 may be provided to indicate a status of the input module 700.

It will be appreciated that having eight channels is merely one design option and other embodiments may comprise greater (or fewer) channels.

Programmable I/O pins of the FPGA 705 are used to directly drive low power isolated supplies, supplying the channels 701 without the need for additional power amplifiers.

Figure 12:
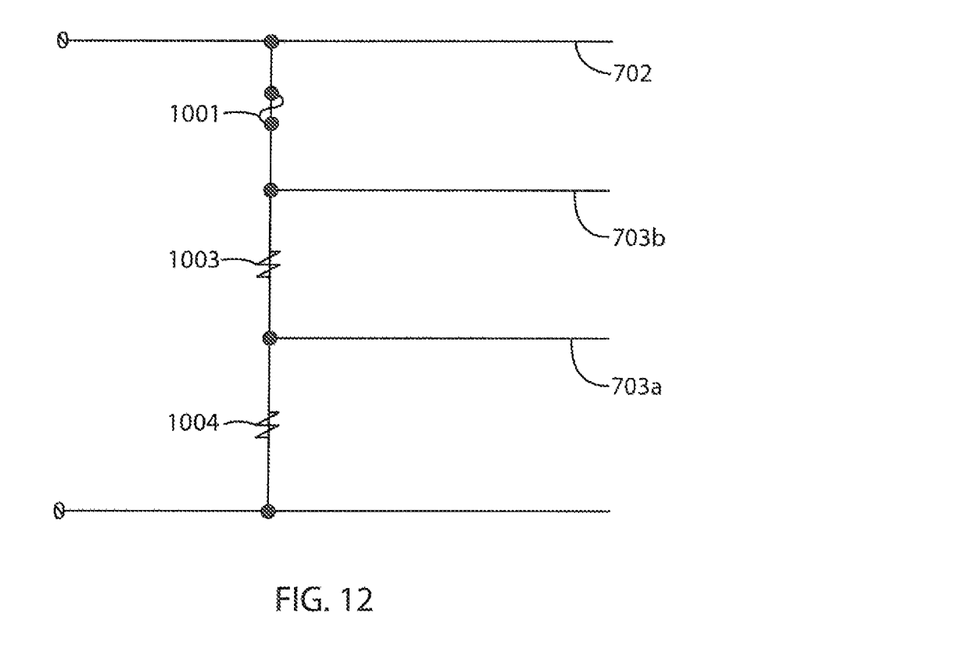
FIG. 12 is a circuit diagram of an analogue input termination assembly.

Referring to FIG. 12, an analogue input field conditioning circuit for measuring field 4-20 mA analogue current loop signals from a field device comprises a fuse 1001 in series with sense resistors 1003, 1004. The use of the fuse means that the sense resistors 1003, 1004 only need to operate to the maximum rating of the fuse, which in some embodiments is 50 mA. A blown fuse signal 702 is output to the input module to allow the input module to sense and report a blown fuse condition.

The field conditioning circuit shown in FIG. 12 outputs a primary sense signal 703a and a secondary sense signal 703b for use by the input channel 701.

Figure 13:
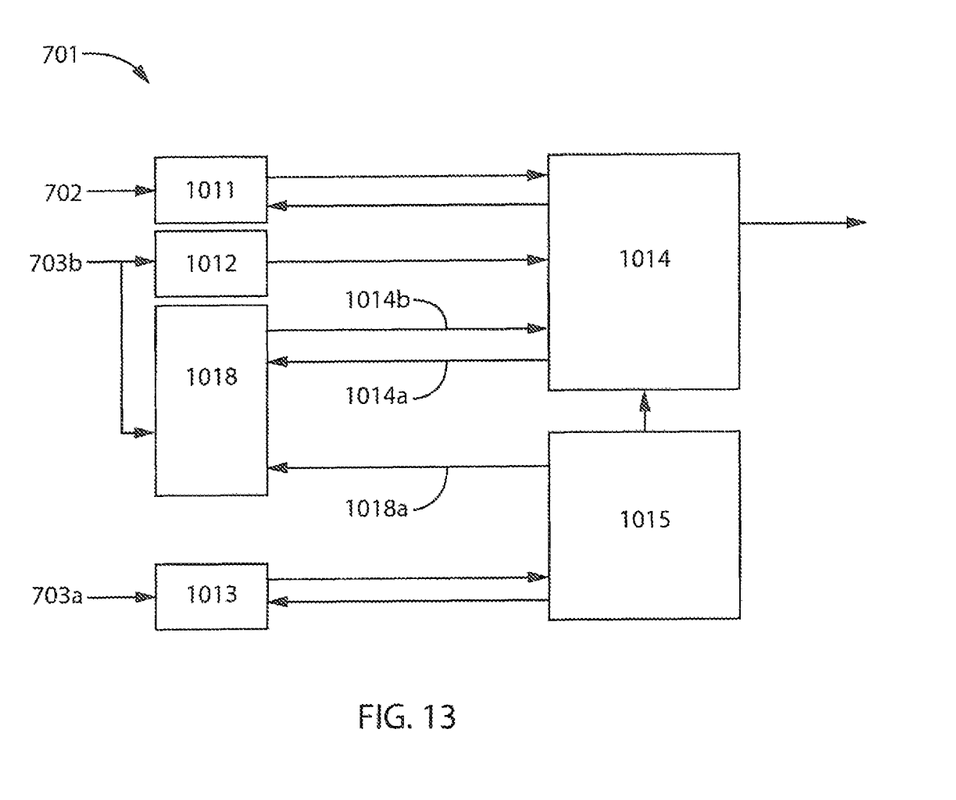
FIG. 13 is a schematic illustration of a HART module.

One of the input channels 701 is illustrated in FIG. 13 and comprises a blown fuse circuit 1011, a primary input circuit 1013 and a secondary input circuit 1012 for detecting the 4-20 mA signal, which will not be described further here. The input channel 701 also comprises a HART input/output (I/O) module 1018. The HART I/O module 1018 is connected to an analogue input which bears secondary signal 703b and is arranged to send and receive HART data to a field device. Generation and transmission of HART data is not described in detail herein. In general, however, HART output data is generated in dependence upon a digital input signal 1014a received from a microprocessor 1014. Output from the HART I/O module 1018 is enabled by a HART enable signal 1018a supplied by microprocessor 1015. A signal 1014b, representing HART input data is sent to the microprocessor 1014 for decoding. The signal 1014b may be generated according to the methods described above with reference to FIGS. 1 through 4.

It will be appreciated that while particular arrangements for providing industrial control systems are described above, embodiments for decoding FSK signals from a received analogue signal are more widely applicable. Indeed, embodiments described herein may be used to decode any FSK signal superimposed on a received analogue signal. Similarly, while embodiments herein are described with reference to the HART protocol, it will be appreciated that the methods described herein are not limited to the HART protocol, but may be used, generally, to decode digital data encoded within electronic signals.

It should be understood that the disclosure is not limited in its application to the details of construction and arrangements of the components set forth herein. The disclosure is capable of other embodiments and of being practiced or carried out in various ways. Variations and modifications of the foregoing are within the scope of the present disclosure. It also being understood that the disclosure disclosed and defined herein extends to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure.

We claim:

1. A method for processing an electrical signal comprising:
   receiving an electrical signal comprising a frequency modulated signal encoding digital data;
   sampling a first portion of the electrical signal to obtain a plurality of samples to obtain a first sample set;
   determining an index value from the first sample set by:
      comparing each sample in the first sample set to a threshold value;
      assigning a first value to each sample that is above the threshold value;
      assigning a second value to each sample that is at or below the threshold value; and
      outputting the assigned values for the first sample set as the index value;
   comparing the determined index value with a plurality of predetermined index values to identify a first output value from a plurality of predetermined output values, each of the predetermined index values corresponding to one of the plurality of predetermined output values;

wherein each of the predetermined output values indicates a respective frequency modulation encoded value and the first output value indicates a frequency modulation encoded value within the first portion of the electrical signal; and outputting an indication of the first output value.

2. The method of claim 1, wherein the first output value is a HART data bit.

3. The method of claim 1, wherein the first sample set comprises N samples, wherein the sample value for each sample is a 1-bit binary value, and wherein the index value is a N-bit value generated using the 1-bit binary value for each sample.

4. The method of claim 1, wherein sampling the first portion of the electrical signal comprises sampling the first portion of the electrical signal at a sample rate of 83.3 µs.

5. The method of claim 1, wherein sampling the first portion of the electrical signal comprises obtaining ten samples from the first portion of the electrical signal such that the first sample set comprises ten samples.

6. The method of claim 1, wherein said first portion is one of a plurality of sampled portions of the electric signal, each sampled portion providing a respective sample set.

7. The method of claim 6, wherein the plurality of sampled portions are contiguous.

8. The method of claim 7, wherein each of the plurality of sample sets differs from an immediately preceding one of the plurality of sample sets by a single sample such that the plurality of sample sets define a sliding window over the received electrical signal.

9. The method of claim 6, wherein each of said sample sets is associated with a respective count and the method further comprises selecting the first sample set from the plurality of sample sets based on a count associated with the first sample set.

10. The method of claim 9, wherein the count is in a phase locked loop with respect to data bits encoded within the frequency modulated signal such that the count is synchronized with the data bits encoded within the frequency modulated signal.

11. The method of claim 10, wherein a count associated with said first sample set indicates that the first sample set is associated with a substantially middle portion of a data bit encoded within the frequency modulated signal.

12. The method of claim 1, further comprising:
populating said plurality of predetermined output values, said populating comprising:
for each of said predetermined index values selecting a respective data bit for association with that predetermined index value.

13. The method of claim 12, wherein selecting a respective data bit for association with an index value comprises applying a Fourier transform to the index value and selecting a data bit in dependence upon the resulting frequency distribution.

14. The method of claim 13, further comprising selecting a data bit value of '1' if the resulting frequency distribution is primarily centered around 1200 Hz and selecting a data bit value of '0' if the resulting frequency distribution is centered around 2200 Hz.

15. An apparatus for processing an electrical signal comprising:
a receiver arranged to receive an electrical signal comprising a frequency modulated signal encoding digital data;
a sampler arranged to sample a first portion of the electrical signal to obtain a plurality of samples to obtain a first sample set, and to determine an index value from the first sample set by:
comparing each sample in the first sample set to a threshold value;
assigning a first value to each sample that is above the threshold value; and
assigning a second value to each sample that is at or below the threshold value;
outputting the assigned values for the first sample set as the index value;
a memory storing a plurality of predetermined index values and a plurality of predetermined output values, each of the predetermined index values corresponding to one of the plurality of predetermined output values, each of the predetermined output values indicating a respective frequency modulation encoded value; and
a processing module arranged to process the first sample set to:
compare the determined index value with the predetermined index values to identify a first output value from the plurality of predetermined output values, the first output value indicating a frequency modulation encoded value within the first portion of the electrical signal; and
output an indication of the first output value.

16. The apparatus of claim 15, wherein the first sample set comprises N samples, wherein the sample value for each sample is a 1-bit binary value, wherein the index value is a N-bit value generated using the 1-bit binary value for each sample.

17. The apparatus of claim 15, wherein the sampler is configured to sample the first portion of the electrical signal at a sample rate of 83.3 µs.

18. The apparatus of claim 15, wherein the sampler is configured to obtain ten samples from the first portion of the electrical signal such that the first sample set comprises ten samples.

19. The apparatus of claim 15, wherein said first portion is one of a plurality of sampled portions of the electric signal, each sampled portion providing a respective sample set.

20. The apparatus of claim 19, wherein the plurality of sampled portions are contiguous.

* * * * *